United States Patent
Hwang et al.

(10) Patent No.: US 12,371,601 B2
(45) Date of Patent: Jul. 29, 2025

(54) ENVIRONMENT-FRIENDLY HOT-MELT COMPOSITION FOR VEHICLE INTERIOR MATERIAL

(71) Applicants: Hyundai Motor Company, Seoul (KR); KIA CORPORATION, Seoul (KR)

(72) Inventors: Jin Uk Hwang, Ulsan (KR); Seung Keon Woo, Yangsan-si (KR); Jae Hong Woo, Yangsan-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 155 days.

(21) Appl. No.: 18/388,304

(22) Filed: Nov. 9, 2023

(65) Prior Publication Data

US 2024/0084174 A1    Mar. 14, 2024

Related U.S. Application Data

(62) Division of application No. 17/405,724, filed on Aug. 18, 2021, now Pat. No. 11,851,591.

(30) Foreign Application Priority Data

Dec. 21, 2020    (KR) .................. 10-2020-0179800

(51) Int. Cl.
*C09J 177/10* (2006.01)
*B32B 7/12* (2006.01)
(Continued)

(52) U.S. Cl.
CPC ............ *C09J 177/10* (2013.01); *B32B 7/12* (2013.01); *B32B 37/12* (2013.01); *C09J 5/06* (2013.01);
(Continued)

(58) Field of Classification Search
CPC ....... C09J 177/06; C09J 177/10; C08L 77/06; C08L 77/10
See application file for complete search history.

(56) References Cited

U.S. PATENT DOCUMENTS 4,299,930 A    11/1981  Boggs
4,943,625 A *  7/1990  Hewel .................. C08G 69/265
                                                          528/331

(Continued)

FOREIGN PATENT DOCUMENTS

EP         0382539 A1    8/1990
KR      10-1855924 B1    5/2018
KR    10-2018-0104320 A   9/2018

OTHER PUBLICATIONS

U.S. Notice of Allowance dated Sep. 8, 2023 issued in U.S. Appl. No. 17/405,724.
(Continued)

*Primary Examiner* — Scott W Dodds
(74) *Attorney, Agent, or Firm* — Morgan Lewis & Bockius LLP

(57) ABSTRACT

Disclosed is an environment-friendly hot-melt composition for a vehicle interior material, the hot-melt composition including: 65 wt % to 85 wt % of an aromatic polyamide; 10 wt % to 30 wt % of an aliphatic polyamide; 1 wt % to 5 wt % of an olefinic elastomer graft-polymerized with maleic anhydride; and 0.1 wt % to 2 wt % of an antioxidant.

3 Claims, 7 Drawing Sheets

(51) Int. Cl.
*B32B 37/12* (2006.01)
*C09J 5/06* (2006.01)
*C09J 7/35* (2018.01)
*C09J 177/06* (2006.01)

(52) U.S. Cl.
CPC ............... *C09J 7/35* (2018.01); *C09J 177/06* (2013.01); *B32B 2037/1215* (2013.01); *B32B 2605/003* (2013.01); *C09J 2203/354* (2020.08); *C09J 2301/304* (2020.08); *C09J 2451/00* (2013.01); *C09J 2477/00* (2013.01)

(56) References Cited

U.S. PATENT DOCUMENTS

| | | |
|---|---|---|
| 5,958,283 A | 9/1999 | Schmid |
| 8,691,911 B2 | 4/2014 | Doshi |
| 2003/0023008 A1 | 1/2003 | Uchida |
| 2015/0353792 A1* | 12/2015 | Montanari ........... C08G 69/265 138/140 |

OTHER PUBLICATIONS

U.S. Non-Final Office Action dated May 2, 2023 issued in U.S. Appl. No. 17/405,724.

\* cited by examiner

ENVIRONMENT-FRIENDLY HOT-MELT COMPOSITION FOR VEHICLE INTERIOR MATERIAL

CROSS REFERENCE TO RELATED APPLICATION

This application is a Divisional Patent Application of U.S. patent application Ser. No. 17/405,724, filed on Aug. 18, 2021, which claims priority to and the benefit of Korean Patent Application No. 10-2020-0179800, filed on Dec. 21, 2020, the entire content of which are incorporated herein by reference.

FIELD

The present disclosure relates to an environment-friendly hot-melt composition for vehicle interior materials.

BACKGROUND

The statements in this section merely provide background information related to the present disclosure and may not constitute prior art.

A hot-melt adhesive is an adhesive that is melted by applying heat thereto. A hot-melt adhesive is environmentally friendly because it emits very little volatile organic solvent.

In the related art, liquid hot-melts such as urethane-based hot-melts, acrylic hot-melts, hot-melt webs processed in the form of nonwoven fabrics, and the like have been mainly used. Liquid hot-melt is relatively highly soluble in a solvent, so it is easy to disperse and process, and thus it is widely used as a material for adhering vehicle interior materials.

Moreover, since the main components of the hot-melt web processed in the form of nonwoven fabric are low-melting-point polyamide having crystallinity, low-melting-point polyester, and the like, application thereof to environment-friendly interior materials is expanding in domestic and foreign vehicle industries.

However, in order to produce the conventional hot-melt web as described above, an additional process for temporary bonding to a sponge is desired. Moreover, adhering natural leather or artificial leather to the hot-melt web requires bonding with a hot press using a cutting panel, yielding waste sponge and hot-melt materials, which are cut and discarded. Furthermore, there are disadvantages such as non-uniformity of the hot-melt web, poor ventilation performance, and the like.

SUMMARY

The present disclosure provides a hot-melt composition capable of inhibiting a deterioration in the ventilation performance of vehicle interior materials by not blocking cells on the surface of a sponge or the like. Specifically, the present disclosure provides a hot-melt composition that may be applied in the form of a thin film on a substrate such as a sponge or the like.

The present disclosure provides a novel hot-melt composition capable of overcoming the disadvantages of existing hot-melt compositions, which are made of a crystalline polymer alone and thus harden during application and drying, and the adhesion temperature of which is excessively high.

One form of the present disclosure provides a hot-melt composition including 65 wt % to 85 wt % of an aromatic polyamide, 10 wt % to 30 wt % of an aliphatic polyamide, 1 wt % to 5 wt % of an olefinic elastomer graft-polymerized with maleic anhydride, and 0.1 wt % to 2 wt % of an antioxidant.

The hot-melt composition may have a first melting-point peak observed at 40° C. to 60° C. and a second melting-point peak observed at 100° C. to 110° C. upon thermal analysis using differential scanning calorimetry (DSC).

The aromatic polyamide may have a density of 1.05 $g/cm^3$ to 1.15 $g/cm^3$ and a melting point of 95° C. to 105° C.

The aliphatic polyamide may have an acid value less than 5%.

The aliphatic polyamide may have a melting-point peak present at 40° C. to 60° C., a softening point of 120° C. to 140° C., and a Shore A hardness value of 80 A to 90 A.

The olefinic elastomer graft-polymerized with maleic anhydride may include 1 wt % to 3 wt % of maleic anhydride based on the total weight thereof.

The olefinic elastomer may have a melting point of 70° C. to 100° C.

The olefinic elastomer may include at least one selected from the group consisting of polyethylene, polypropylene, ethylene-α-olefin copolymer, ethylene-vinyl acetate copolymer, ethylene-propylene-diene copolymer, and combinations thereof.

In addition, the present disclosure provides a vehicle interior material including a substrate, an adhesive layer including the hot-melt composition described above and disposed on the substrate, and a skin layer disposed on the adhesive layer.

The adhesive layer may have a thickness corresponding to 30% to 70% of the thickness of the substrate.

In addition, the present disclosure provides a method of manufacturing a vehicle interior material including forming an adhesive layer by applying the hot-melt composition described above on a substrate, cooling the adhesive layer, and attaching a skin layer to the adhesive layer.

The hot-melt composition may be applied on the substrate using a coating roll.

Here, after the adhesive layer is formed, air may be jetted to the substrate and the adhesive layer in order to prevent inhibit the substrate from becoming attached to the coating roll.

According to the present disclosure, since a hot-melt composition is applied on a substrate and a skin layer is attached thereto, an additional process such as temporary bonding of a hot-melt web on the substrate is not desired.

According to the present disclosure, since the hot-melt composition is applied in the form of a thin film on the substrate, cells on the surface of the substrate are not blocked, and thus the ventilation performance of the vehicle interior material is not deteriorated.

According to the present disclosure, since the hot-melt composition is applied on a pre-cut substrate, waste substrate and hot-melt web are not generated.

According to the present disclosure, since a hot-melt composition is formed by appropriately mixing a crystalline material and an amorphous material, disadvantages such as a hard texture and high adhesion temperature of an adhesive layer formed with a conventional hot-melt composition can be overcome.

The effects of the present disclosure are not limited to the foregoing, and should be understood to include all effects that can be reasonably anticipated from the following description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 4A:
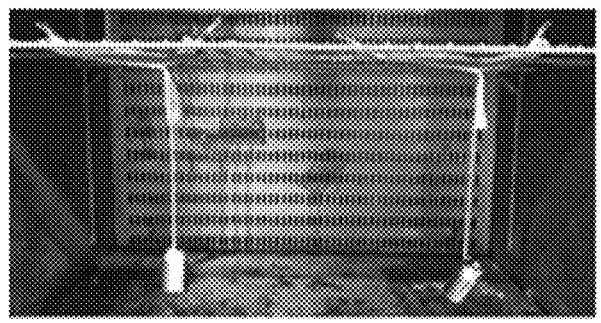
Figure 4B:
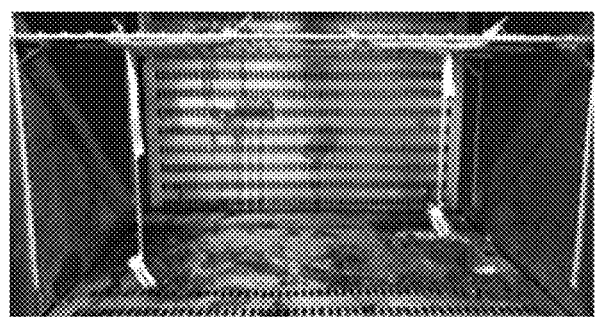
Figure 5A:
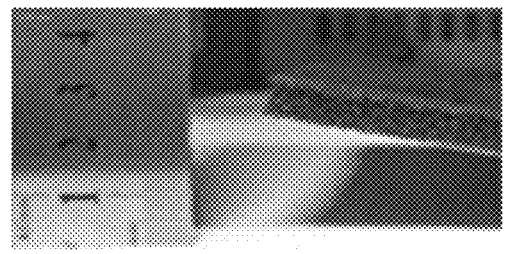
Figure 5B:
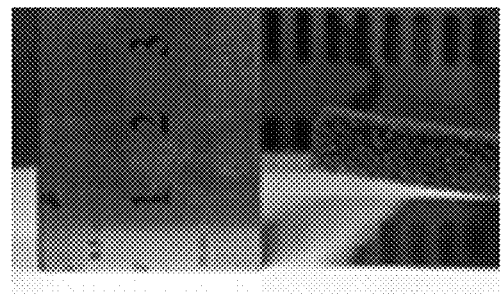
Figure 6A:
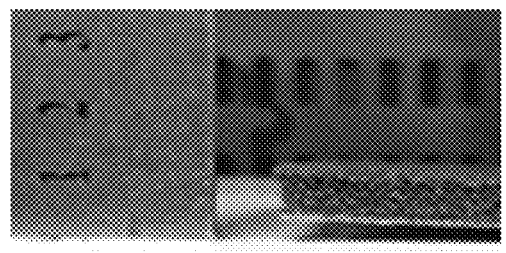
Figure 6B:
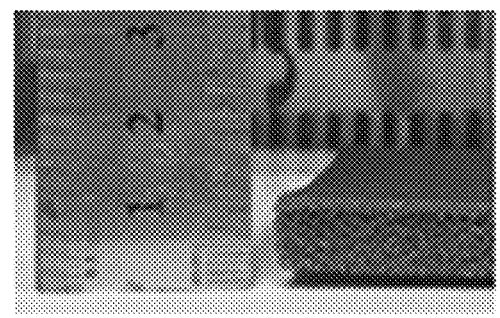
Figure 7A:
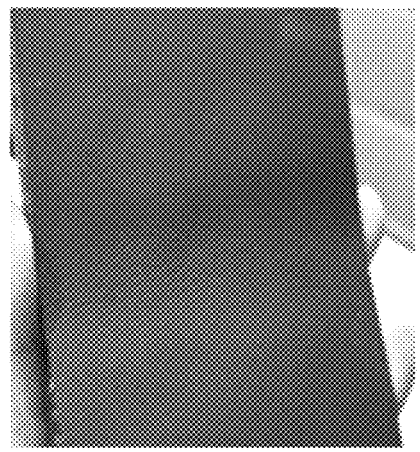
Figure 7B:
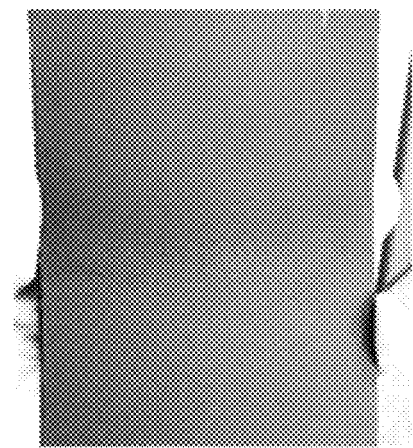
Figure 8A:
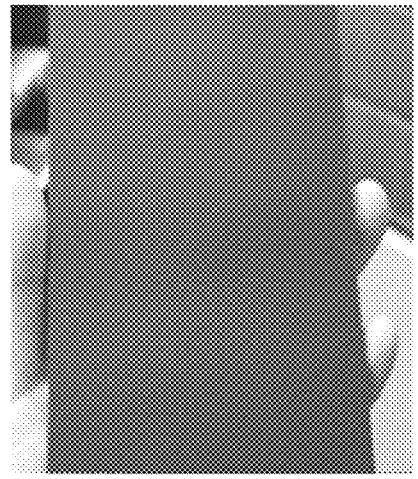
Figure 8B:
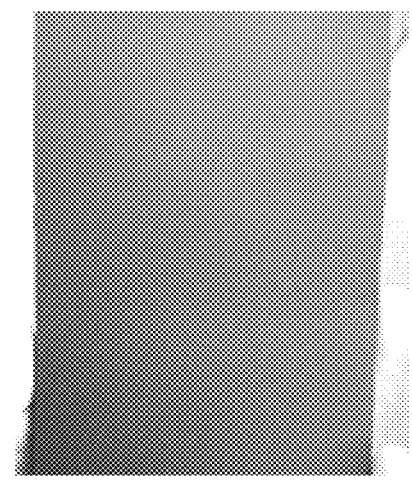

FIG. 4A shows the state in which each test sample is mounted for evaluation of creep durability, and FIG. 4B shows the state after allowing each test sample to stand under specific conditions for evaluation of creep durability, in which, in FIGS. 4A and 4B, the test sample using the conventional polyamide hot-melt composition is on the left, and the test sample using the hot-melt composition according to one form of the present disclosure is on the right;

FIG. 5A is a side view showing a state when a predetermined load is applied to the vehicle interior material using the conventional polyamide hot-melt composition;

FIG. 5B is a side view showing a state when a predetermined load is applied to the vehicle interior material using the hot-melt composition according to one form of the present disclosure;

FIG. 6A is a side view showing the state in which the vehicle interior material of FIG. 5A is restored after removal of the load;

FIG. 6B is a side view showing the state in which the vehicle interior material of FIG. 5B is restored after removal of the load;

FIG. 7A shows the result of observation of the surface of the vehicle interior material according to FIG. 6A;

FIG. 7B shows the result of observation of the surface of the vehicle interior material according to FIG. 7A after restoration for 72 hours;

FIG. 8A shows the result of observation of the surface of the vehicle interior material according to FIG. 6B; and FIG. 8B shows the result of observation of the surface of the vehicle interior material according to FIG. 8A after restoration for 72 hours.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

For the sake of clarity of the present disclosure, the dimensions of structures are depicted as being larger than the actual sizes thereof. It will be understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present disclosure. Similarly, the "second" element could also be termed a "first" element. As used herein, the singular forms are intended to include the plural forms as well, unless the context clearly indicates otherwise.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

The hot-melt composition according to the present disclosure includes 65 wt % to 85 wt % of an aromatic polyamide, 10 wt % to 30 wt % of an aliphatic polyamide, 1 wt % to 5 wt % of an olefinic elastomer graft-polymerized with maleic anhydride, and 0.1 wt % to 2 wt % of an antioxidant.

The present disclosure is characterized in that an aromatic polyamide having high crystallinity and an aliphatic polyamide having an amorphous structure are used in combination in appropriate amounts to produce a hot-melt composition having high cooling speed, high adhesion, and high flexibility and processability. In particular, when the amount of the aromatic polyamide and the amount of the aliphatic polyamide fall within the above numerical ranges, such effects may be obtained.

The aromatic polyamide may have a density of 1.05 g/cm$^3$ to 1.15 g/cm$^3$ and a melting point of 95° C. to 105° C. Also, the aliphatic polyamide may have an acid value less than 5%, a melting-point peak of 40° C. to 60° C., a softening point of 120° C. to 140° C., and a Shore A hardness value of 80 A to 90 A. Here, the "acid value" indicates the number of mg of potassium hydroxide desired to neutralize free fatty acids and other acidic substances contained in 1 g of aliphatic polyamide, and is represented as a percentage in the present specification. In addition, the "melting-point peak" is a peak that is observed when the aliphatic polyamide is thermally analyzed through differential scanning calorimetry (DSC). When the melting point of the aromatic polyamide and the melting point of the aliphatic polyamide fall within the above numerical ranges, the above-described cooling speed, adhesion, flexibility, and processability may be improved in a balanced manner.

The olefinic elastomer graft-polymerized with maleic anhydride is a kind of compatibilizer, and may result from graft-polymerizing an olefinic elastomer with maleic anhydride as a functional group.

The olefinic elastomer may include at least one selected from the group consisting of polyethylene, polypropylene, ethylene-α-olefin copolymer, ethylene-vinyl acetate copolymer, ethylene-propylene-diene copolymer, and combinations thereof. The olefinic elastomer may have a melting point of 70° C. to 100° C.

The olefinic elastomer graft-polymerized with maleic anhydride may include 1 wt % to 3 wt % of maleic anhydride based on the total weight thereof.

The type of the antioxidant is not particularly limited, and examples thereof may include hindered phenolic antioxidants, hydroquinone derivatives, phenolic antioxidants, and the like.

Figure 1:
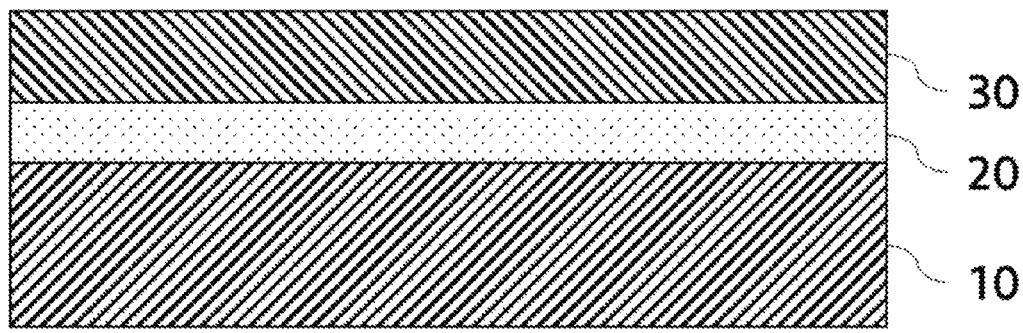
FIG. 1 is a cross-sectional view showing a vehicle interior material according to one form of the present disclosure.

FIG. 1 is a cross-sectional view showing a vehicle interior material according to the present disclosure. With reference thereto, the vehicle interior material may include a substrate 10, an adhesive layer 20 disposed on the substrate 10 and including the hot-melt composition, and a skin layer 30 disposed on the adhesive layer 20.

The substrate 10 may be a base layer that defines the overall shape of the vehicle interior material.

The substrate 10 may include a sponge, foam, or nonwoven fabric, having open cells. However, the type of the substrate 10 is not limited thereto, and may be a film or a sheet.

The adhesive layer 20 may be formed by applying the hot-melt composition on the substrate 10.

The adhesive layer 20 may have a thickness corresponding to 30% to 70% of the thickness of the substrate 10. When the thickness of the adhesive layer 20 falls within the above numerical range, the molten hot-melt composition does not penetrate to the inside of the substrate 10, so the adhesive layer 20 is capable of maintaining the form of a thin film. Accordingly, an orange-peel phenomenon, by which the surface texture of the substrate 10 appears on the skin layer 30, does not occur.

The skin layer 30 is located at the outermost position and is exposed to the outside when the vehicle interior material is mounted on the vehicle.

The type of the skin layer 30 is not particularly limited, and may be, for example, leather, plastic, etc.

The method of manufacturing the vehicle interior material according to the present disclosure may include forming an adhesive layer by applying the hot-melt composition on a substrate, cooling the adhesive layer, and attaching a skin layer to the adhesive layer.

The hot-melt composition may be applied on the substrate using a coating roll. Here, a phenomenon by which the substrate rolls onto the coating roll due to the presence of the hot-melt composition may occur. In order to inhibit this phenomenon, the substrate may be separated from the coating roll by jetting air to the intermediate including the substrate and the adhesive layer. Furthermore, a sensor capable of detecting a substrate that rolls onto the coating roll may be additionally provided, and the jetting of air may be controlled based on detection thereof by the sensor.

The adhesive layer may be cooled using an air fan capable of forming a series of airflows. Accordingly, cooling may be achieved even more quickly.

A better understanding of the present disclosure may be obtained through the following examples. However, these examples are merely set forth to illustrate the present disclosure, and are not to be construed as limiting the scope of the present disclosure.

Example 1—Thermal Analysis Using Differential Scanning Calorimetry (DSC)

Figure 2:
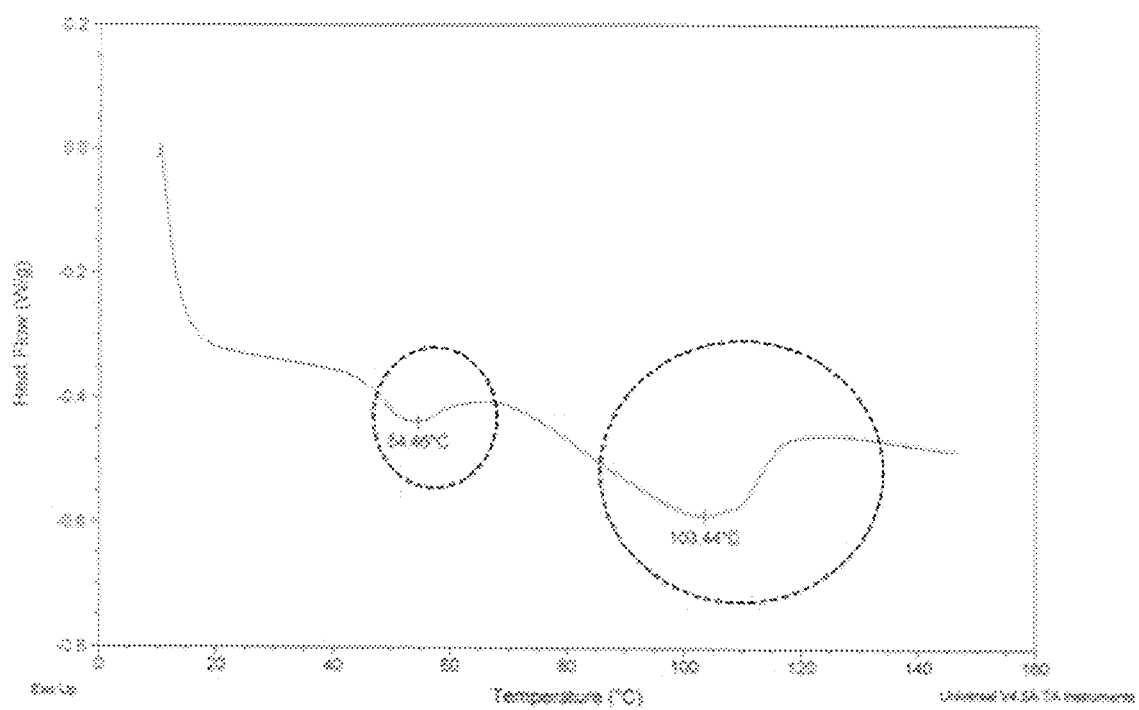
FIG. 2 shows the result of analysis of a hot-melt composition according to one form of the present disclosure using differential scanning calorimetry (DSC)

The hot-melt composition according to one form of the present disclosure was thermally analyzed using differential scanning calorimetry (DSC). The results thereof are shown in FIG. 2.

As shown therein, the hot-melt composition according to one form of the present disclosure included a first melting-point peak observed at 40° C. to 60° C. and a second melting-point peak observed at 100° C. to 110° C.

It can be deduced from the first melting-point peak that the hot-melt composition has superior flexibility and processability. Also, it can be deduced from the second melting-point peak that the hot-melt composition is crystalline and thus is melted stably only at a constant temperature and cools rapidly when the temperature falls out of the melting range. Therefore, it can be concluded that the use of the hot-melt composition of the present disclosure ensures adhesion stability of the vehicle interior material.

Example 2—Evaluation of Surface Quality

Each of the hot-melt composition according to the present disclosure and the conventional polyamide hot-melt composition was applied on the surface of a sponge, and leather was then attached thereto, after which the surface thereof was observed with the naked eye.

Figure 3A:
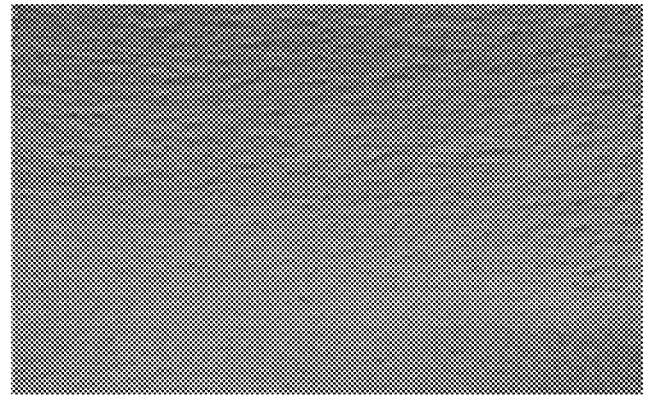
FIG. 3A shows the result of visual observation of the surface of a vehicle interior material using a conventional polyamide hot-melt composition.
Figure 3B:
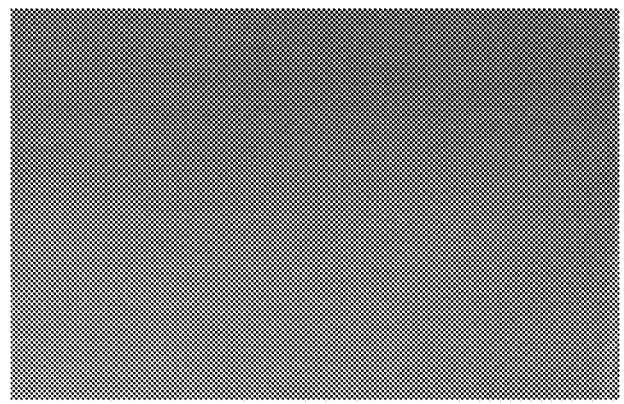
FIG. 3B shows the result of visual observation of the surface of a vehicle interior material using the hot-melt composition according to one form of the present disclosure.

FIG. 3A shows the result of the conventional polyamide hot-melt composition, and FIG. 3B shows the result of the hot-melt composition according to the present disclosure. With reference thereto, it can be seen that the conventional polyamide hot-melt composition underwent an orange-peel phenomenon, by which the surface texture of the sponge exhibits irregularities on the surface of the leather, whereas the hot-melt composition according to the present disclosure exhibited a smooth surface of the leather.

Example 3—Evaluation of Creep Durability

Each of the hot-melt composition according to one form of the present disclosure and the conventional polyamide hot-melt composition was applied on the surface of a sponge, and leather was then attached thereto, thereby manufacturing a vehicle interior material having a width of 25 mm and a length of 150 mm.

After forcibly peeling 50 mm from each test sample, a 100 g weight was hung at the forcibly peeled end of the test sample and left there for 24 hours at 100° C. After 24 hours, the peeled length was measured to evaluate creep durability.

FIG. 4A shows the state in which each test sample is mounted before evaluation of creep durability. FIG. 4B shows the state after each test sample is allowed to stand under the above conditions. In FIGS. 4A and 4B, the test sample using the conventional polyamide hot-melt composition is on the left, and the test sample using the hot-melt composition according to the present disclosure is on the right.

About 80 mm of the test sample using the conventional polyamide hot-melt composition peeled, whereas the test sample using the polyamide hot-melt composition according to one form of the present disclosure did not peel at all.

The conventional polyamide hot-melt composition has to be melted at a temperature about 20° C. to 40° C. higher than the melting point thereof in order to increase adhesion. In this case, however, excessive shrinkage of the skin layer, such as leather, occurred, which is undesirable. The hot-melt composition according to one form of the present disclosure exhibited superior adhesion even when melted and adhered at a temperature about 10° C. to 20° C. higher than the melting point thereof, so excessive shrinkage of the skin layer did not occur.

Example 4—Evaluation of Wrinkling

Each of the hot-melt composition according to one form of the present disclosure and the conventional polyamide hot-melt composition was applied on the surface of a sponge, and leather was then attached thereto, thereby manufacturing a vehicle interior material.

A predetermined load was applied to each vehicle interior material for 20 minutes. FIG. 5A shows the vehicle interior material using the conventional polyamide hot-melt composition when viewed from the side. With reference thereto, it can be seen that the end of the vehicle interior material is about 24 mm away from the surface of the ground. FIG. 5B shows the vehicle interior using the polyamide hot-melt composition according to one form of the present disclosure when viewed from the side. With reference thereto, it can be seen that the end of the vehicle interior material is about 15 mm away from the surface of the ground, indicating that the vehicle interior material according to one form of the present disclosure is not greatly bent by the load.

Meanwhile, the predetermined load was removed from each vehicle interior material, and the vehicle interior material was allowed to restore for 20 minutes. FIG. 6A shows the vehicle interior material using the conventional polyamide hot-melt composition when viewed from the side. With reference thereto, it can be seen that the end of the vehicle interior material is about 4 mm away from the surface of the ground. FIG. 6B shows the vehicle interior material using the polyamide hot-melt composition according to one form of the present disclosure when viewed from the side. With reference thereto, it can be seen that the end of the vehicle interior material is about 2 mm away from the surface of the ground, indicating that the vehicle interior material according to one form of the present disclosure has vastly superior restorability when bent.

FIG. 7A shows the result of observation of the surface of the vehicle interior material using the conventional polyamide hot-melt composition according to FIG. 6A. FIG. 7B shows the result of observation of the surface of the vehicle interior material after restoration for 72 hours. With reference thereto, it can be seen that, even after restoration for 72 hours, the vehicle interior material using the conventional polyamide hot-melt composition has a wide and deep wrinkle.

FIG. 8A shows the result of observation of the surface of the vehicle interior material using the polyamide hot-melt composition according one form of the present disclosure according to FIG. 6B. FIG. 8B shows the result of observation of the surface of the vehicle interior material after restoration for 72 hours. With reference thereto, it can be seen that the vehicle interior material using the polyamide hot-melt composition according to one form of the present disclosure develops hardly any bent wrinkles and is completely restored after 72 hours.

Example 5

Properties such as adhesive strength and the like of the hot-melt compositions having the melting-point peaks shown in Table 1 below were measured.

TABLE 1

| Classification | First melting-point peak | Second melting-point peak | Adhesive strength | Heat-resistant cycle (single) | Creep durability | Skin shrinkage | Wrinkling |
| --- | --- | --- | --- | --- | --- | --- | --- |
| Example 5 | 40-60° C. | 100-110° C. | Pass (8 N) | Pass | Pass | Pass | Pass |
| Comparative Example 1 | 30-39° C. | 90-99° C. | Pass (5.6 N) | Fail (90° C./24 h) | Fail | Pass | Pass |
| Comparative Example 2 | 61° C. or higher | 110° C. or higher | Pass (7 N) | Pass | Pass | Fail | Fail |

As is apparent from Table 1, in Example 5, which is the hot-melt composition according to one form of the present disclosure, all properties reached desired levels, but Comparative Example 1, having low melting-point peaks, exhibited poor heat-resistant cycle and creep durability, and Comparative Example 2, having high melting-point peaks, underwent skin shrinkage and developed wrinkles.

Example 6

Properties such as adhesive strength and the like of the hot-melt compositions using the components in the amounts shown in Table 2 below were measured.

TABLE 2

| Classification | Composition | Amount [wt %] | Adhesive strength | Heat-resistant cycle (single) | Creep durability | Skin shrinkage | Wrinkling |
|---|---|---|---|---|---|---|---|
| Example 6 | Aromatic polyamide | 65-85 | Pass | Pass | Pass | Pass | Pass |
|  | Aliphatic polyamide | 10-30 |  |  |  |  |  |
|  | Graft-polymerized olefinic elastomer | 1-5 |  |  |  |  |  |
|  | Additive | 0.1-2 |  |  |  |  |  |
| Comparative Example 3 | Aromatic polyamide | 64 | Pass | Fail | Fail | Pass | Fail |
|  | Aliphatic polyamide | 30 |  |  |  |  |  |
|  | Graft-polymerized olefinic elastomer | 6 |  |  |  |  |  |
|  | Additive | — |  |  |  |  |  |
| Comparative Example 4 | Aromatic polyamide | 86 | Pass | Pass | Pass | Fail | Fail |
|  | Aliphatic polyamide | 10 |  |  |  |  |  |
|  | Graft-polymerized olefinic elastomer | 5 |  |  |  |  |  |
|  | Additive | — |  |  |  |  |  |

As is apparent from Table 2, in Example 6, which is the hot-melt composition according to one form of the present disclosure, all properties reached desired levels. On the other hand, Comparative Example 3, in which the amount of the aromatic polyamide was low and the amount of the graft-polymerized olefinic elastomer was high, exhibited poor heat-resistant cycle and creep durability and developed wrinkles. In addition, Comparative Example 4, in which the amount of the aromatic polyamide was high, underwent skin shrinkage and developed wrinkles.

The test examples and examples of the present disclosure have been described in detail above, but the scope of the present disclosure is not limited to the test examples and examples described above. Various modifications and improvements capable of being devised by those skilled in the art using the basic concept of the present disclosure defined in the following claims also fall within the scope of the present disclosure.

What is claimed is:

1. A method of manufacturing a vehicle interior material, the method comprising:
    forming an adhesive layer by applying a hot-melt composition on a substrate;
    cooling the adhesive layer; and
    attaching a skin layer to the adhesive layer,
    wherein the hot-melt composition comprises:
        65 wt % to 85 wt % of an aromatic polyamide,
        10 wt % to 30 wt % of an aliphatic polyamide, and
        1 wt % to 5 wt % of an olefinic elastomer graft-polymerized with maleic anhydride.

2. The method of claim 1, wherein the hot-melt composition is applied on the substrate using a coating roll.

3. The method of claim 1, further comprising:
    after forming the adhesive layer, jetting air to the substrate and the adhesive layer and inhibiting the substrate from being attached to the coating roll.

* * * * *